US009967159B2

(12) United States Patent
Shroff et al.

(10) Patent No.: US 9,967,159 B2
(45) Date of Patent: May 8, 2018

(54) SYSTEMS AND METHODS FOR PROVIDING DECISION TIME BROKERAGE IN A HYBRID CLOUD ECOSYSTEM

(71) Applicant: Infosys Limited, Bangalore (IN)

(72) Inventors: Abhijit Shroff, Bangalore (IN); Venkata Reddy Donthireddy, Bangalore (IN); Santha Kumar Rajangam, Madurai (IN); Prasanna Raman Sridhar, Hyderabad (IN); Babu Jayaraj, Bengaluru (IN)

(73) Assignee: Infosys Limited, Bangalore (IN)

( * ) Notice: Subject to any disclaimer, the term of this patent is extended or adjusted under 35 U.S.C. 154(b) by 0 days. days.

(21) Appl. No.: 13/755,437

(22) Filed: Jan. 31, 2013

(65) Prior Publication Data

US 2013/0198050 A1   Aug. 1, 2013

(30) Foreign Application Priority Data

Jan. 31, 2012   (IN) .............................. 360/CHE/2012

(51) Int. Cl.
| | |
|---|---|
| *H04L 12/26* | (2006.01) |
| *H04L 12/24* | (2006.01) |
| *G06F 9/50* | (2006.01) |
| *H04W 4/02* | (2018.01) |

(52) U.S. Cl.
CPC ............ *H04L 43/04* (2013.01); *G06F 9/5072* (2013.01); *H04L 41/5009* (2013.01)

(58) Field of Classification Search
USPC .......................................................... 705/34
See application file for complete search history.

(56) References Cited

U.S. PATENT DOCUMENTS

| | | | | |
|---|---|---|---|---|
| 6,630,985 | B2 * | 10/2003 | Hase ................................ | 355/30 |
| 6,930,985 | B1 * | 8/2005 | Rathi ...................... | H04L 41/08 |
| | | | | 370/254 |
| 2004/0236660 | A1 * | 11/2004 | Thomas ................. | G06Q 10/10 |
| | | | | 705/37 |
| 2012/0185868 | A1 * | 7/2012 | Bartfai-Walcott ...... | G06F 9/445 |
| | | | | 718/105 |
| 2012/0190386 | A1 * | 7/2012 | Anderson .............. | G01C 15/04 |
| | | | | 455/456.3 |

* cited by examiner

*Primary Examiner* — Garcia Ade
(74) *Attorney, Agent, or Firm* — LeClairRyan PLLC (57) ABSTRACT

A method and system for providing decision-time brokerage in a hybrid cloud ecosystem is disclosed. Disclosed embodiments may include receiving a workload input by a brokerage engine executing in a computing device communicably connected to at least one cloud computing node in a cloud platform of a cloud service provider, determining resource optimization for the workload input by the brokerage engine, monitoring the workload input for compliance with one or more audit and regulatory metrics, monitoring the cost consumption of the workload input, capturing non-functional context data associated with the workload input into a context repository database, applying one or more rules to the workload, deploying the workload across the one or more cloud platforms. In some embodiments, a deployment recommendation may be provided prior to deployment of the workload. In some embodiments, a social collaboration workflow may be triggered whereby one or more users are provided the deployment recommendation.

45 Claims, 8 Drawing Sheets

SYSTEMS AND METHODS FOR PROVIDING DECISION TIME BROKERAGE IN A HYBRID CLOUD ECOSYSTEM

This application claims the benefit of Indian Patent Application Filing No. 360/CHE/2012, filed Jan. 31, 2012, which is hereby incorporated by reference in its entirety.

FIELD OF TECHNOLOGY

This disclosure relates generally to the field of cloud computing in general and more particularly to a system and method to accelerate enterprise cloud computing by providing decision time cloud brokerage.

BACKGROUND

Cloud computing models are becoming increasingly popular in the enterprise space. Increasingly, enterprises may use cloud platforms to provide on-demand access to a pool of compute resources that may then be used to provide infrastructure, platforms and software as a service (IaaS, Paas and SaaS). The benefits of this approach are significant, as cloud platform services may be rapidly provisioned on demand with minimal service provider interaction. Cloud deployed applications or resources are also easily accessible. A cloud computing implementation of a software application may allow an organization to access the application through the internet without needing to control an existing technology infrastructure supporting the application.

Enterprises may seek to utilize cloud service provider offerings in various ways. While the commercial benefits of cloud deployment of a software application, for example, may be obvious to an enterprise, such deployment may also involve significant capital expenditure and/or operational expenditure if the enterprise chooses to set up and manage a private cloud infrastructure. Alternatively, an existing public cloud infrastructure may be exploited in order to reduce such costs. Regardless of deployment model, it may be desirable to be able to create a bridge between a public and private cloud model, a hybrid model that also provides for application and data integration with public cloud software-as-a-service offerings. Consequently, there may be demand for asecure gateway to access public cloud resources through a single prism sitting inside the enterprise wall.

Another commercial consideration in cloud deployment is in determining the suitability of a particular application or resource for such deployment. Therefore, it may be desirable to take into account the deployment model and characteristics of the application workload to determine the right fit cloud deployment model.

An additional consideration may involve formalizing enterprise social conversation in order to provide effective governance of cloud workload deployments, such that the enterprise has a large degree of control over policy application to a particular workload, even if the workload is deployed in a public cloud platform, or a private cloud platform, or any combination thereof. What is needed, then, is an integrated cloud brokerage solution that addresses the management of cloud workloads across a hybrid cloud ecosystem and aims at accelerating enterprise cloud adoption by adopting a human oriented interaction model.

SUMMARY

Disclosed are methods, system, and instructions embodied in non-transitory computer readable media for providing decision time brokerage in a hybrid cloud ecosystem.

In one aspect, a method may include receiving a workload input by a brokerage engine executing in a computing device communicably connected to at least one cloud computing node in a cloud platform of a cloud service provider, wherein the computing device comprises at least one processor and an associated processor readable memory. The workload input may be at least one input selected from a group consisting of at least one workload pattern parameter associated with at least one cloud platform of a cloud service provider, at least one policy parameter associated with the cloud platform, and at least one cost attribute associated with the cloud platform. Additionally, run-time optimization of the workload input may be determined by the brokerage engine. Determining may comprise monitoring the workload input for compliance with one or more audit and regulatory metrics, wherein the audit and regulatory metrics include at least one of an enterprise regulatory compliance metric and a governmental regulatory compliance metric. Determining may additionally comprise monitoring the cost consumption of the workload input, wherein cost consumption includes metering cost associated with deploying the workload on a cloud platform. Determining may additionally comprise capturing non-functional context data associated with the workload input into a context repository database, and applying one or more rules to the workload. A rule may be at least one of an infrastructural, business, compliance, departmental, portfolio or enterprise context rule in a rules repository database communicably coupled with the brokerage engine. Applying a rule may comprise optimizing provisioning of the workload across one or more cloud platform on the basis of the one or more rules. The workload may then be deployed, by the brokerage engine, across the one or more cloud platforms.

In another aspect, a disclosed system, in accordance with at least one embodiment, may include a brokerage engine executed in a computing device communicably connected to at least one cloud platform of a cloud service provider, wherein the computing device comprises at least one processor and an associated processor readable memory and the cloud platform is a networked computing environment. The brokerage engine may be configured to receive a workload input. The workload input may be at least one input selected from a group consisting of at least one workload pattern parameter associated with at least one cloud platform of a cloud service provider, at least one policy parameter associated with the cloud platform, and at least one cost attribute associated with the cloud platform. The brokerage engine may be additionally configured to determine resource optimization for the workload input by the brokerage engine, monitor the workload input for compliance with one or more audit and regulatory metrics, wherein the audit and regulatory metrics include at least one of an enterprise regulatory compliance metric, an industry standards body compliance metric and a governmental regulatory compliance metric, monitor the cost consumption of the workload input, wherein cost consumption includes metering cost associated with deploying the workload on a cloud platform, capture non-functional context data associated with the workload input into a context repository database, and apply one or more rules to the workload, wherein a rule is at least one of an information technology, business, compliance, departmental, portfolio or enterprise context rule in a rules repository database communicably coupled with the brokerage engine and applying comprises optimizing provisioning of the workload across one or more cloud platform on the basis of the one or more rules. The system may be additionally configured to recommend a deployment plan for the workload across the one or more cloud platforms to user through a communicably coupled display means.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide a method, an apparatus and/or a system for an integrated enterprise cloud brokerage platform. Although the present embodiments have been described with reference to specific example embodiments, it will be evident that various modifications and changes may be made to these embodiments without departing from the broader spirit and scope of the various embodiments.

The present invention discloses a hybrid cloud ecosystem hub that aims to accelerate enterprise cloud adoption by providing an integrated solution that enables, as in some embodiments, an enterprise user to set up a private cloud, integrate with public clouds and move applications and data securely between private and public clouds. Some embodiments aid enterprise business functionality through functional social workflows that serve to facilitate the interaction of enterprise users with users, rather than with systems. Embodiments of the present invention may additionally facilitate the building of a social enterprise for a next generation enterprise ecosystem comprising employees, partners, customers, and investors.

Figure 1:
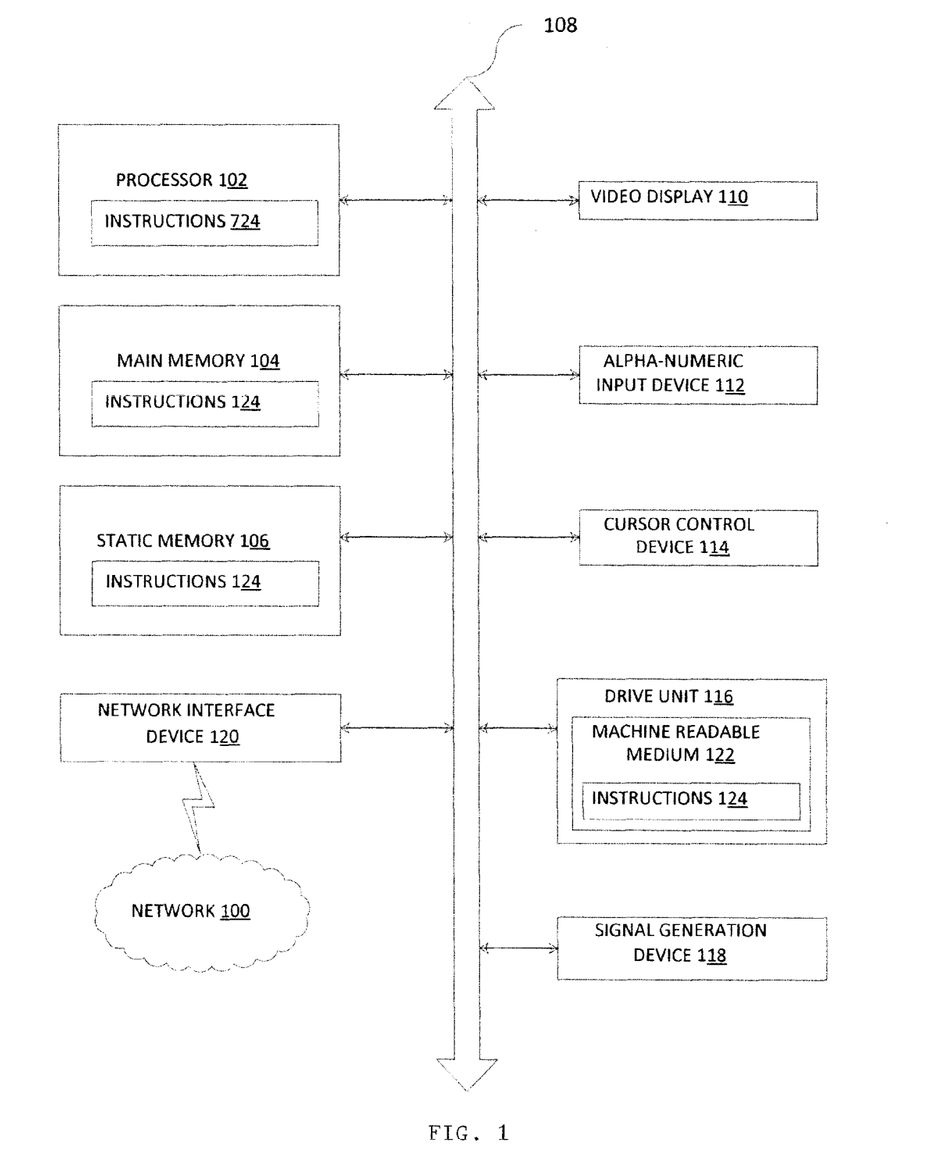
FIG. 1 is a diagrammatic representation of a data processing system capable of processing a set of instructions to perform any one or more of the methodologies herein, according to one embodiment.

FIG. 1 is a diagrammatic representation of a data processing system capable of processing a set of instructions to perform any one or more of the methodologies herein, according to one embodiment. FIG. 1 shows a diagrammatic representation of a machine in the example form of a computer system 100 within which a set of instructions, for causing the machine to perform any one or more of the methodologies discussed herein, may be executed. In various embodiments, the machine operates as a standalone device and/or may be connected (e.g., networked) to other machines.

In a networked deployment, the machine may operate in the capacity of a server and/or a client machine in server-client network environment, or as a peer machine in a peer-to-peer (or distributed) network environment. The machine may be a personal—computer (PC), a tablet PC, a set-top box (STB), a Personal Digital Assistant (PDA), a cellular telephone, a web appliance, a network router, switch or bridge, an embedded system and/or any machine capable of executing a set of instructions (sequential and/or otherwise) that specify actions to be taken by that machine. Further, while only a single machine is illustrated, the term "machine" shall also be taken to include any collection of machines that individually and/or jointly execute a set (or multiple sets) of instructions to perform any one and/or more of the methodologies discussed herein.

The example computer system 100 includes a processor 102 (e.g., a central processing unit (CPU) a graphics processing unit (GPU) and/or both), a main memory 104 and a static memory 106, which communicate with each other via a bus 108. The computer system 100 may further include a video display unit 110 (e.g., a liquid crystal displays (LCD) and/or a cathode ray tube (CRT)). The computer system 100 also includes an alphanumeric input device 112 (e.g., a keyboard), a cursor control device 114 (e.g., a mouse), a disk drive unit 116, a signal generation device 118 (e.g., a speaker) and a network interface device 120.

The disk drive unit 116 includes a machine-readable medium 122 on which is stored one or more sets of instructions 624 (e.g., software) embodying any one or more of the methodologies and/or functions described herein. The instructions 124 may also reside, completely and/or at least partially, within the main memory 104 and/or within the processor 102 during execution thereof by the computer system 100, the main memory 104 and the processor 102 also constituting machine-readable media.

The instructions 124 may further be transmitted and/or received over a network 126 via the network interface device 120. While the machine-readable medium 122 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" shall also be taken to include any medium that is capable of storing, encoding and/or carrying a set of instructions for execution by the machine and that cause the machine to perform any one or more of the methodologies of the various embodiments. The term "machine-readable medium" shall accordingly be taken to include, but not be limited to, solid-state memories, optical and magnetic media, and carrier wave signals.

Figure 2:
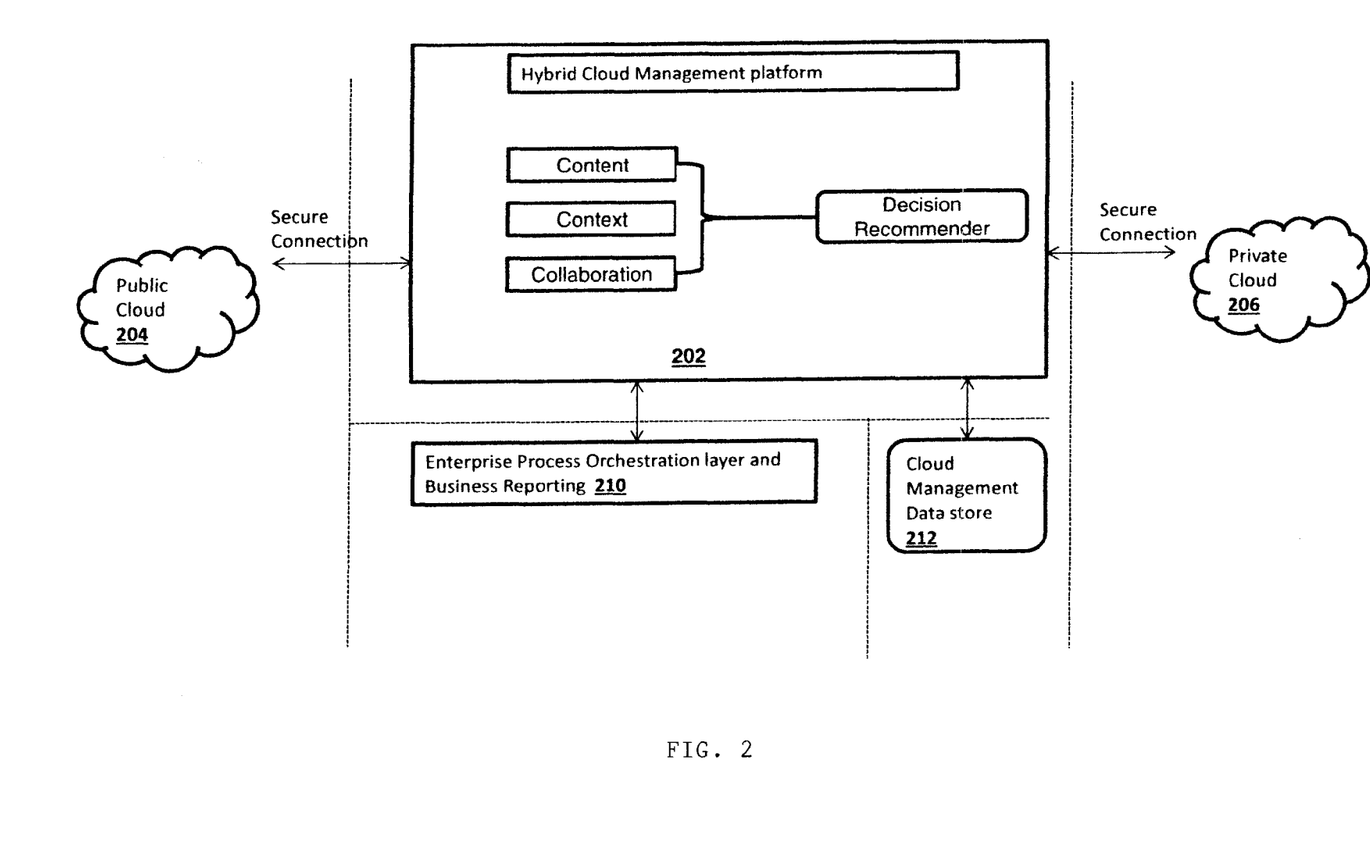
FIG. 2 is a schematic diagram of a hybrid cloud management platform, according to one or more embodiments.

A representation of an embodiment of the present implementation of a hybrid cloud management platform is shown in FIG. 2. The hybrid cloud management platform 202 may be communicably connected to at least one public cloud, such as in 204, and/or at least one public cloud, such as in 206. The hybrid cloud management platform may incorporate a brokerage engine that receives a content input, such as, for example, a workload input by a user that is to be deployed across one or more of the communicably connected cloud platforms. The hybrid cloud management platform 202 may additionally incorporate, as in some embodiments, a reporting and process orchestration and deployment layer, such as that depicted in 210, and associated cloud management data stores, such as that in 212. Context data relevant to the received content input may be extracted from the content input, or from the data stores 210. In some embodiments, the context information so derived may be used to initiate a collaboration workflow. In some embodiments, a workload deployment plan may be recommended to the user by the platform 202. In some embodiments, the platform 202 may self-deploy the workload based on historical context data relevant to the user and/or the input workload. The operation of the brokerage engine in the hybrid cloud management platform is further described, but not limited to, the following figures and explanations.

Figure 3:
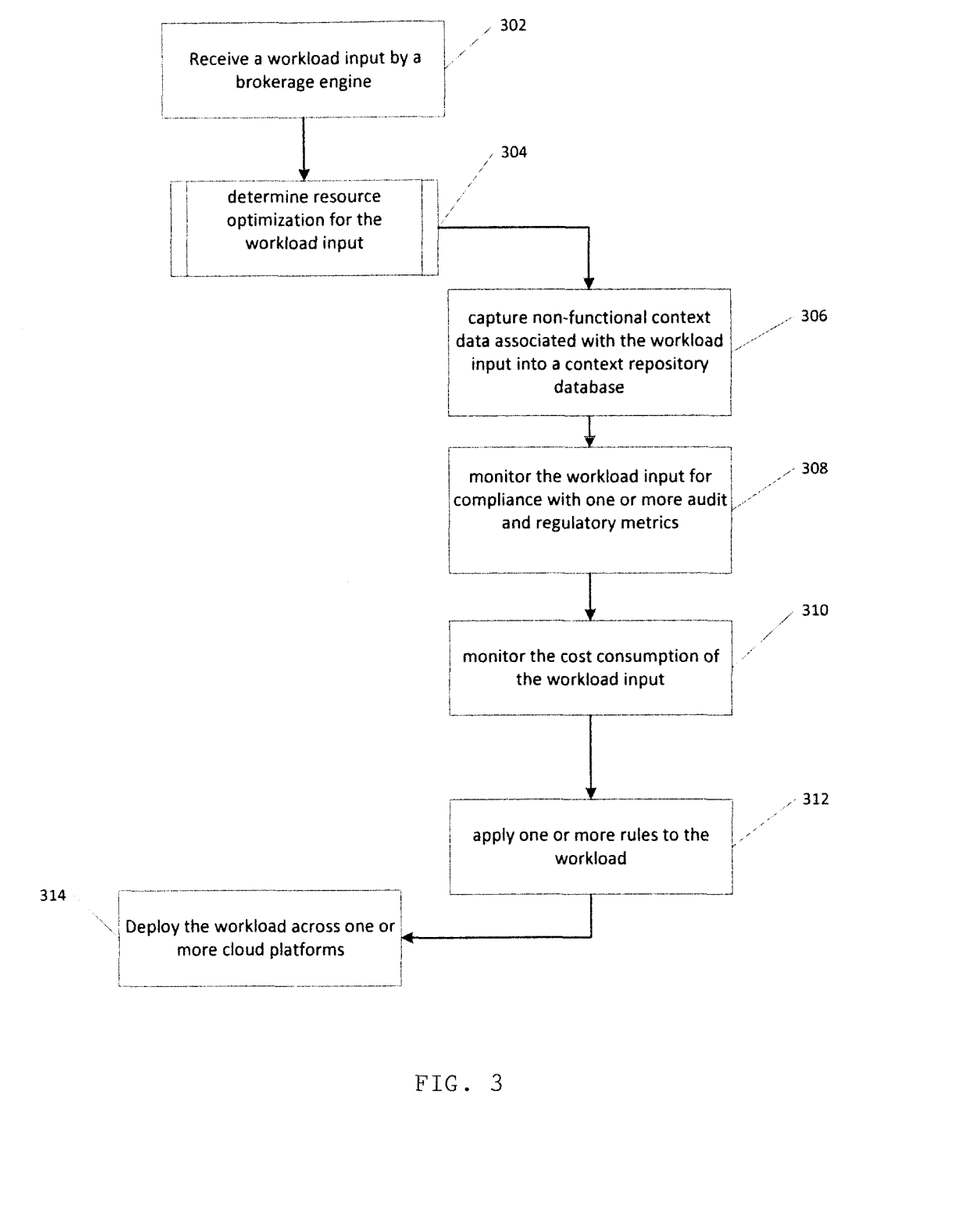
FIG. 3 is an illustrative flowchart of a method for decision-time brokerage in an integrated cloud ecosystem including one or more private and public cloud platforms, in accordance with at least one embodiment.

Referring now to FIG. 3, a first step in the present implementation may include receiving a workload input by a brokerage engine executing in a computing device, such as that described by FIG. 1, communicably connected to at least one cloud computing node in a cloud platform of a cloud service provider, as in 302 of FIG. 3. The brokerage engine is an intelligent business decision support mechanism to help optimize the placement, integration and operations of business workloads in a hybrid cloud ecosystem as further illustrated in FIG. 6. The workload input may be at least one input selected from a group consisting of at least one workload pattern parameter associated with at least one cloud platform of a cloud service provider, at least one policy parameter associated with the cloud platform, and at least one cost attribute associated with the cloud platform.

More specifically, a pattern parameter associated with the workload input may include information describing the historical performance of one or more private or public cloud services, including at least the historical service level agreement compliance rates of the private or public cloud services. The pattern parameter may additionally include information describing the historical usage of the one or more private or public cloud services by the user of the brokerage engine platform, including at least non-functional and functional requirements for cloud services of the enterprise user.

A policy parameter may include information describing compliance rates of the one or more private or public cloud services with enterprise standards and policies, such as, for example, an enterprise data protection policy. Compliance rates of the cloud service providers with one or more government or industry regulatory policies may also be included.

A cost attribute associated with the cloud platform may include information related to the business value of the workload on the cost of operations, or capital expenditure, or business performance, or growth and workforce productivity of the enterprise user of the present brokerage engine.

Cloud service providers may include private clouds, including, for example, networked infrastructure containing at least one supernode deployed by the enterprise user, or public clouds, such as, for example, Amazon™ Web Services infrastructure. Additional private cloud service providers may include at least one of an on-premise cloud service provider, an external hosted private cloud provider, a virtual private cloud. An additional public cloud service provider could include a community cloud.

Figure 6:
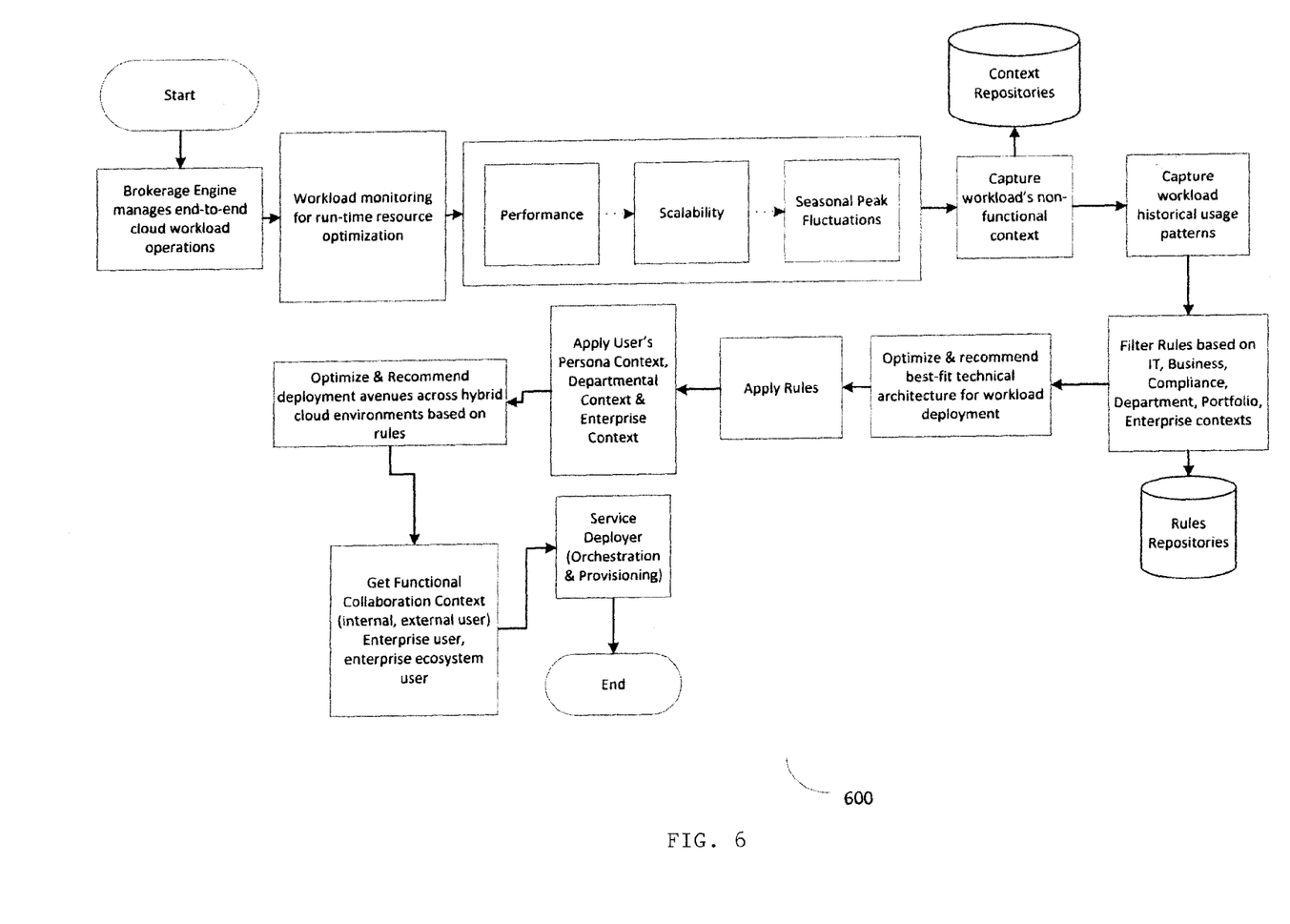
FIG. 6 is an illustrative process flow diagram for determining run time resource optimization of an input workload to a cloud brokerage engine, in accordance with at least one embodiment.

Then, as in 304, resource optimization for the workload is determined by the brokerage engine as illustrated further in FIG. 6. Resource optimization may include both infrastructural resource optimization, that is, ensuring the workload to be deployed or orchestrated across the one or more cloud service providers is deployed in a cost or compute resource efficient manner, as well as selecting a single cloud provider for deployment of the workload, if the single cloud provider provides a resource optimal deployment opportunity for the workload.

Then, as in 306, the non-functional context data associated with the workload input is captured and written to a context repository database that is writeably connected to the brokerage engine as illustrated in FIG. 6. As in some embodiments, the context data may include enterprise context data, and/or user persona context data, and/or business workload context data, and/or technical context data, and/or application lifecycle context data, and/or service provider context data, and/or service usage context data. If a particular workload has been previously input to the brokerage engine, its corresponding context data may be retrieved from the context repository. If the workload has not been previously input, then the non-functional context data may be captured.

Capturing may be performed through extraction and analysis of data logs or metadata associated with the workload. Analysis and extraction of the data logs or metadata associated with the input workload may provide the non-functional context data that is then written to the context repository database.

In some embodiments, enterprise context data thus extracted may include at least one of information security rules, governance rules, budget data, business goal targets data, capital and operation expenditure data and business performance data.

In some embodiments, user persona context data thus extracted may include at least one of job profile data, user behavior data, user service usage data, organizational hierarchy data, a social connections index and historical usage data.

In some embodiments, technical context data thus extracted may include at least one of workload resource requirements data, technical interoperability data, location data and data usage data.

In some embodiments, application lifecycle context data thus extracted may include at least one of application lifecycle stage data, project schedule data, project service level agreements ('SLA') data, project requirements data, project budgeting data, project portfolio and environment data.

In some embodiments, service provider context data thus extracted may include at least one of a service provider offerings catalogue, policy compliance history, notifications data, service non-functional historical context data, future service offerings roadmap data, service consumption data, service provider financial health data and service interoperability data.

In some embodiments, service usage context data thus extracted may include computing resource consumption data, service usage cost data, and service usage compliance data.

Determining may then include, as in 308, monitoring the workload input for compliance with one or more audit or regulatory metrics. More specifically, the audit and regulatory metrics include at least one of an enterprise regulatory compliance metric, an industry standards body compliance metric and a governmental regulatory compliance metric.

Figure 7:
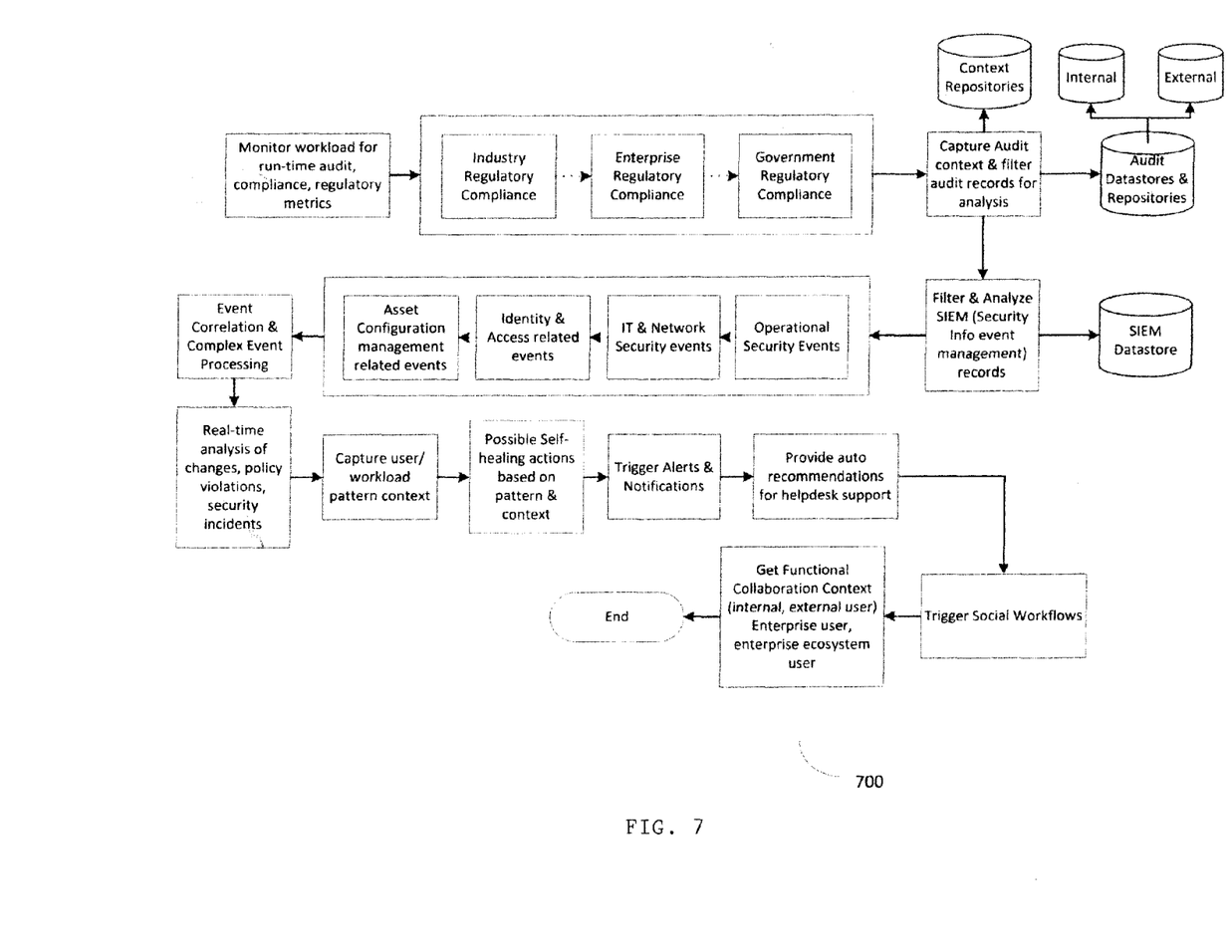
FIG. 7 is an illustrative process flow diagram for monitoring an input workload to a cloud brokerage engine for run-time audit, compliance and regulatory metrics, in accordance with at least one embodiment.

Monitoring of the workload input for compliance is more specifically described with respect to FIG. 7. If the workload input is a pre-existing workload, context information relevant to one or more compliance metrics may be retrieved from the context repository. Policies associated with the compliance metrics may be determined from an internal audit datastore or repository located at the enterprise user, or an external audit datastore or repository located at an external cloud service provider.

Retrieved audit records and compliance information associated with the workload input are then analyzed for deviations from the one or more retrieved policies. One or more security event records may then be examined. Events may be discovered, in some embodiments, in one or more security information event management records retrievable from a datastore at the cloud provider. Events may include operational security events, information technology ('IT') and network security events, identity and access related events, and access configuration management related events. In some embodiments, the triggered events may then be correlated with one or more of the policy deviations or security incidents discovered as a result of the analysis.

An alert notification may be delivered to a user on triggering an event. In some embodiments, one or more recommendations directed toward remedying the discovered policy deviations or security incidents may be generated. The recommendations generated may be specific to a particular user or workload context.

Referring again to FIG. 3, a next step in the determination of resource optimization of the workload may include monitoring the cost consumption of the workload, as in 310. Workload cost may be predetermined, or continuous. Such consumption by the workload may be metered over the course of a predefined consumption cycle. Cloud service consumption requested by the workload may include consumption of application services, compute resources, or data storage.

Service subscription data may then be retrieved. The service subscription data may be constructed on the basis of information in the workload, that is, service provider context information provided in the workload input. The service subscription data may alternatively be retrieved from a service subscriptions repository communicably coupled with the brokerage engine module. The service subscription data may be populated with service provider and ecosystem contracts and subscription data retrieved from previously input workloads. Prior to workload deployment, the associated service provider data may be written to the service subscriptions repository.

The metered consumption may be validated against one or more predefined quota allocations, including, for example, a specified departmental or project budget. If the predefined quota is exceeded, an alert may be delivered to the user, identifying the quota and the quantum of excess. In some embodiments, deployment of the workload may be stopped, pending manual approval.

Exceptions to the alert may be input to the brokerage engine. Such exceptions may be input on encountering an alert, or they may be input prior to workload delivery. Behavior associated with exceptions approval may be recorded and added to a user persona context. Patterns of behavior thereby created and associated with exceptions approval may be used to create or refine a set of consumption patterns context data, stored in the context repository.

Figure 8:
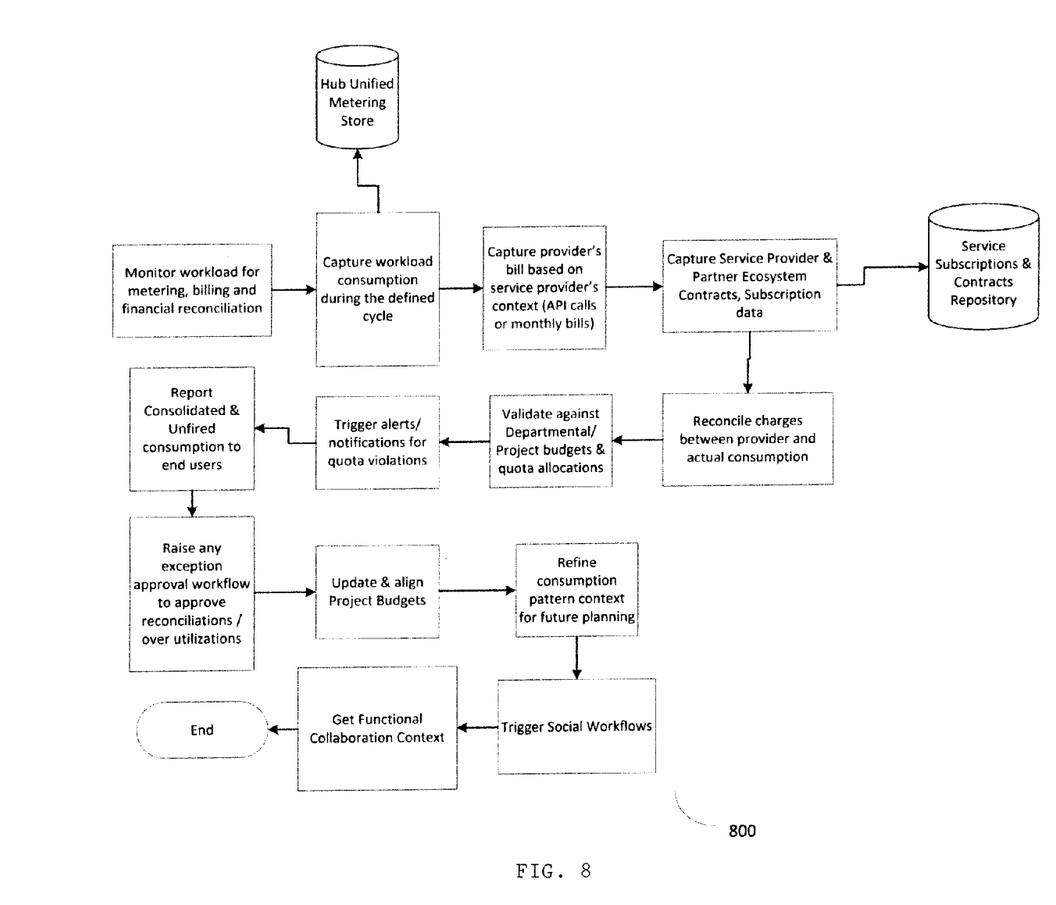
FIG. 8 is an illustrative process flow diagram for monitoring the cost consumption of an input workload to a cloud brokerage engine, in accordance with at least one embodiment.

In some aspects, the budget impact of the metered charges may be projected. Budget data may be retrieved from the context repository, or from the workload input. Impact is measured by comparing the budget data to the calculated service consumption charge. If the service consumption charge exceeds predefined budget impact thresholds, an alert may be accordingly raised. Monitoring of cost consumption is additionally detailed in FIG. 8.

Then, as in 312, one or more rules may be applied to the workload. A rule may be at least one of an information technology, business, compliance, departmental, portfolio or enterprise context rule as illustrated in FIG. 6. Rules may be retrieved from a rules repository database communicably coupled with the brokerage engine. Application of the rule may include optimizing provisioning of the workload across one or more cloud platforms on the basis of the one or more rules as illustrated in one of the steps in FIG. 6. Optimizing may, in some aspects, include the modification of the workload to comply with one or more discovered policy or compliance violations.

Then, as in 314, the workload may be deployed across the one or more cloud platforms.

In some embodiments, following capture of non-functional context information associated with the workload, enterprise architectural validation may be performed. That is, the technical architecture requirements associated with the workload may be validated against existing provider architecture, internal or external. The architectural requirements of the workload may be determined from the captured context information. The existing provider architecture may be determined from, as in some embodiments, an architecture repository communicably coupled with the brokerage engine as illustrated in FIG. 6. Architecture validation may involve extraction of standard enterprise technical architecture information, data storage information, and infrastructure policies information from the repository. In some embodiments, a set of design patterns and frameworks associated with the provider architecture. In some embodiments, governance policies associated with deployment of a workload may be determined from the repository. The retrieved information may then be validated against the specified requirements of the workload. If the requirements are not compatible, an alert may be generated and displayed to a user through a display means operably connected to the brokerage engine platform.

Figure 4:
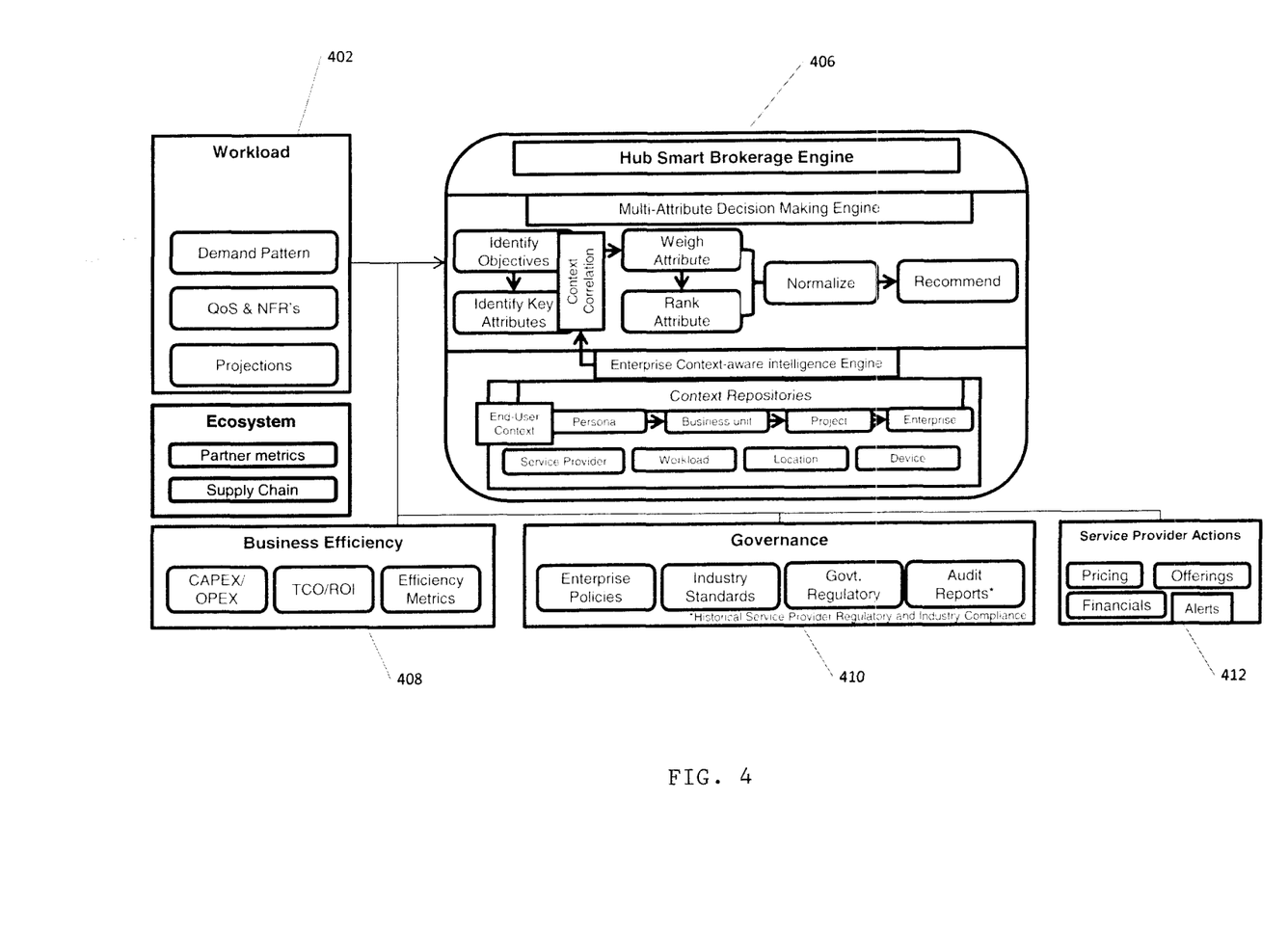
FIG. 4 illustrates a smart brokerage engine for providing decision-time cloud brokerage, in accordance with at least one embodiment.

In some embodiments, a recommendation for deployment of the workload may be provided by the brokerage engine at decision time. The recommendation may consist of a deployment plan designed to optimally provision the cloud resource across one or more cloud providers. An embodiment of a decision time brokerage engine is illustrated in FIG. 3. Referring now to FIG. 4, 402 illustrates a workload input to the brokerage engine. In this example embodiment, the workload input may consist of one or more demand patterns, quality of service ('QoS') parameters, and non-functional requirements ('NFR's), and cloud service demand projection estimates. Ecosystem related parameters associated with the workload are specified in 404. Ecosystem parameters input thereby to the brokerage engine may include service provider metrics, including policy and subscription data. Business efficiency related parameters input to the brokerage engine are illustrated by means of 408. Business efficiency parameters may include operational and capital expenditure data, return on investment ('ROI'), cost of ownership ('TCO'), and other business efficiency metrics. Governance parameters are illustrated by means of 410. Governance parameters may include enterprise policies, industry and regulatory standards and audit reports. Governance parameters may include, as an example, information relating to HIPAA or ISO 27001 standards. Some service provider parameters input to the brokerage engine are identified in 412, and may include pricing and subscription data, service plan offerings and related financial data, and plan alerts data.

One or more objectives may be identified in the workload input by the brokerage engine 406. Objectives may be input by a user, or identified on the basis of a predetermined user intent. User intent may be determined on the basis of the historical actions and behavior data in the user persona data associated with the user profile with which the workload is received. In some embodiments, the user persona data used to isolate the objectives may be supplemented with enterprise and service provider context data identified in the workload input.

Key attributes in the workload are then identified. Attributes are isolated from the one or more input parameters. Attributes may be correlated with the identified objectives. One or more attributes that are relevant to the identified objectives may be tagged as key attributes. Attributes may be weighted and ranked in accordance with their degree of correlation to one or more objectives. The weighted data may be normalized. A deployment plan may then be recommended on the basis of the normalized data.

Figure 5:
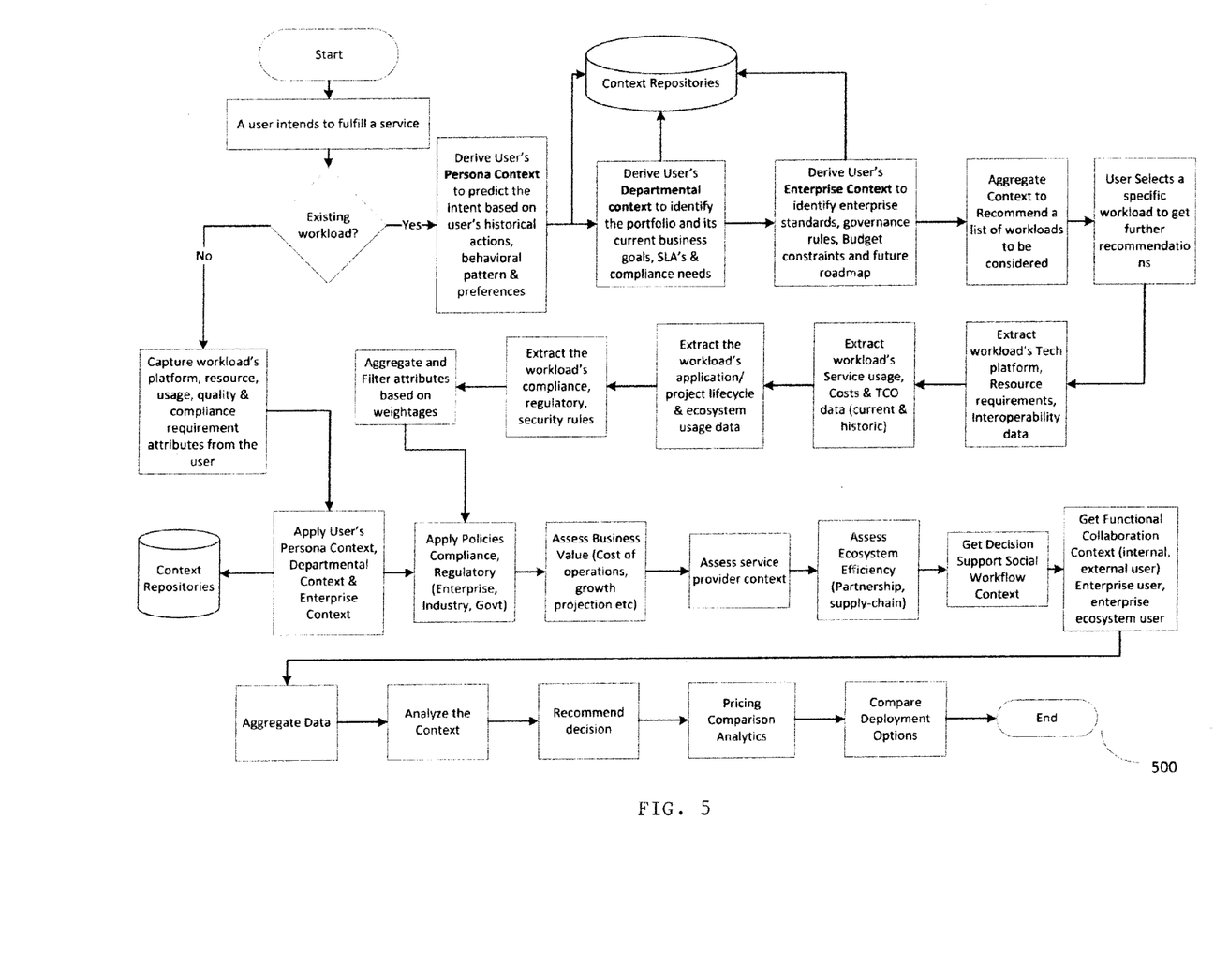
FIG. 5 is an illustrative process flow diagram for providing decision time brokerage by a cloud brokerage engine, in accordance with at least one embodiment.

In yet another embodiment, a decision-time cloud service fulfillment recommendation may be provided as in FIG. 5. More specifically, when a user, such as a user in an enterprise where present embodiments are deployed, intends to fulfill a service, the workload input is examined. If the workload is an existing workload, that is, if the workload has been previously deployed by the brokerage engine, then the user's persona context information, departmental context information and enterprise context information are examined to identify objectives for the workload. The context information and currently input workload may be used to identify one or more prior input workloads that have been optimized. These pre-optimized workloads may be presented to the user through a display interface connected to the brokerage engine computing device. If a particular prior input workload is selected, the workloads' technical interoperability, compliance and service usage data are aggregated and assessed across a range of business, compliance, service provider and efficiency metrics and recommended if found suitable against the identified objectives.

If the workload input is not recognized as a previously input workload, then at least the workload platform, resource usage, quality and compliance requirement attributes are captured from user input. User persona context data is then associated with the workload and stored in the context repository. The workload is then assessed for suitability against one or more input objectives and a recommendation provided, as in FIG. 5. In additional embodiments, comparative pricing schemes associated with any of a plurality of cloud service providers may be provided for a range of deployable workloads to the user.

In additional embodiments, a social workflow may be triggered prior to deployment, or prior to providing a recommendation for a deployment plan. The social workflow may include retrieving user profile context data in the captured non-functional context data, and creating a functional collaboration context on the basis of the user profile context data. The functional collaboration context step also illustrated in FIG. 6, associated with the workload input may be determined at least by determining an organizational hierarchy associated with the user profile, and by determining historical behavior associated with the user profile, and by determining a social connection context associated with the user profile. A collaboration notification may then be communicated to a computing device associated with a second user, wherein the second user computing device is network connected to the first user computing device and wherein the network address of the second user computing device is determined by means of historical behavior data associated with the second user profile, the second user profile context data being stored on the context repository database. The second user profile may be determined on the basis of the functional collaboration context associated with the user profile. In some embodiments, the collaboration notification may be sent to two or more users. In other embodiments, the functional collaboration context may be determined for two or more users. In this way, a multi user social workflow may be enabled.

Embodiments of the present invention may provide distinct advantages for enterprises by allowing them to accelerate their cloud adoption including, but not limited to, accessing and managing cloud resources by means of the present implementation, building a cloud ecosystem, making sense of business data in real-time, collaborating with an enterprise ecosystem through social workflows, and integrating unified communication features (voice, data, messaging and video) into enterprise functional workflows.

Embodiments of the present invention may provide for single window access to a broad set of cloud functionalities and eliminate multiple integration points into a public or private cloud. By doing so, present embodiments may eliminate security issues associated with moving enterprise applications and data between private and public clouds. Furthermore, present embodiments may provide a real-time view into distributed application (distributed across private and public clouds) workload and performance.

Embodiments of the present invention may have application in providing a model to simulate future workloads on enterprise applications and predict capacity requirements and application performance, thus helping enterprises proactively determine predict application behavior and identify problems before they occur.

Embodiments of the present invention may have application in providing usage based metering/billing for access to all enterprise resources deployed on the cloud, as well as manage ongoing quality of service assurance, service lifecycle management and cloud management.

Embodiments of the present invention may enable a model-based simulated approach to determining application capacity requirements and performance in a distributed cloud scenario. Further, embodiments may enforce enterprise quality process on application development lifecycle through functional collaborative workflows. Still further, aspects of current embodiments may be exploited to provide meaningful information to end user searches through adding context awareness and historical user behavior analysis to search results.

Embodiments of the present invention may have application in providing a single enterprise digital data vault for all enterprise on-premise or cloud data assets irrespective of type of data, including structured or unstructured data, or of deployment location on a single cloud data source.

Embodiments of the present invention may have application in providing an enterprise Platform-as-a-Service for application development coupled with an application lifecycle management or governance procedure for project management, quality assurance, testing, packaging, deployment, sustenance and ongoing optimization, while providing full integration with backend enterprise systems.

Embodiments of the present invention may provide for a collective intelligence and analytics engine that enable a real-time view into enterprise data assets, including data center, social media interactions and predictive analytics.

Embodiments of the present invention may provide context-aware and relevant information based on historical user behavior, user search patterns and the current context of his interactions.

Embodiments of the present invention may incorporate a social collaboration fabric for providing enterprise business functions as collaborative workflows for improved user productivity and faster decision making while providing better auditability for compliance and regulatory purposes.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware, firmware and software (e.g., embodied in a machine readable medium). For example, the various electrical structure and methods may be embodied using transistors, logic gates, and electrical circuits (e.g., application specific integrated (ASIC) circuitry and/or in digital signal processor (DSP) circuitry).

In addition, it will be appreciated that the various operations, processes, and methods disclosed herein may be embodied in a machine-readable medium and/or a machine accessible medium compatible with a data processing system (e.g., a computer devices), may be performed in any order (e.g., including using means for achieving the various operations). Accordingly, the specification and drawings are to be regarded in an illustrative rather than a restrictive sense.

What is claimed is:

1. A method for improved deployment of workloads across cloud platforms of an integrated cloud ecosystem, the method comprising:
   receiving, by a cloud brokerage computing device, workload input data for a workload, wherein the workload input data comprises at least one workload pattern parameter, policy parameter, or cost attribute;
   determining, by the cloud brokerage computing device, resource optimization data based on the workload input data, wherein the determining the resource optimization data comprises determining compliance of the workload with one or more audit and regulatory metrics, cost consumption of the workload, and non-functional context data associated with the workload, wherein the audit and regulatory metrics include at least one of an enterprise regulatory compliance metric, an industry standards body compliance metric or a governmental regulatory compliance metric and the cost consumption includes metering cost associated with deploying the workload based on a budget;
   applying, by the cloud brokerage computing device, one or more rules to the workload input data, wherein the one or more rules comprise at least one of an information technology, business, compliance, departmental, portfolio or enterprise context rule in a rules repository database; and
   deploying, by the cloud brokerage computing device, the workload across a cloud ecosystem according to deployment plan data generated based on the resource optimization data and the application of the one or more rules to the workload input data, wherein the deployment plan data comprises a deployment plan for optimally deploying the workload that is generated prior to deployment of the workload on any platform.

2. The method of claim 1, wherein the non-functional context data comprises at least one of enterprise context data, user persona context data, business workload context data, technical context data, application lifecycle context data, service provider context data, or service usage context data.

3. The method of claim 2, wherein the enterprise context data comprises at least one of information security rules, governance rules, budget data, business goal targets data, capital and operation expenditure data or business performance data.

4. The method of claim 2, wherein the user persona context data comprises at least one of job profile data, user behavior data, user service usage data, organizational hierarchy data, a social connections index or historical usage data.

5. The method of claim 2, wherein the technical context data comprises workload resource requirements data, technical interoperability data, location data or data usage data.

6. The method of claim 2, wherein the service usage context data comprises computing resource consumption data, service usage cost data, or service usage compliance data.

7. The method of claim 1, wherein the determining compliance with one or more audit and regulatory metrics further comprises:
   analyzing the non-functional context data associated with the workload for deviations from one or more retrieved policies comprising a predefined industry regulatory compliance policy, a predefined enterprise regulatory compliance policy, or a predefined governmental regulatory compliance policy; and
   triggering an alert notification based on the analysis, wherein the alert notification is a communicated to a user through a graphical user interface on a display device.

8. The method of claim 7, further comprising providing a remedial recommendation to a user through the display device, wherein the remedial recommendation comprises information related to enforcing policy compliance of the workload.

9. The method of claim 7, further comprising:
   retrieving, by the cloud brokerage computing device, at least one first user profile context data from the context repository database;
   creating, by the cloud brokerage computing device, a functional collaboration context on the basis of the at least one first user profile context data, wherein the functional collaboration context associated with the workload is determined based on an organizational hierarchy associated with the at least one first user profile, historical behavior associated with the at least one first user profile, or a social connection context associated with the at least one first user profile; and
   communicating, by the cloud brokerage computing device, a collaboration notification to a second computing device associated with at least one second user, wherein the at least one second computing device is network connected to the at least one first user computing device and wherein:
      the network address of the at least one second computing device is determined based on historical behavior data associated with at least one second user profile, the at least one second user profile context data being stored on the context repository database; and the at least one second user profile is determined on the basis of the functional collaboration context associated with the first user profile.

10. The method of claim 9, further comprising communicating, by the cloud brokerage computing device, a deployment approval notification to the second computing device.

11. The method of claim 10, further comprising deploying, by the cloud brokerage computing device, the workload only when the deployment approval notification is relayed back by the second computing device.

12. The method of claim 1, wherein the monitoring cost consumption further comprises:
   metering cloud service consumption or computing resource consumption by the workload;
   calculating charges associated with the workload on the basis of service subscription data retrieved from a service subscriptions repository database;
   validating charges associated with the cloud service consumption or computing resource consumption by the workload against budget data in a set of enterprise context data in the workload input data and the service usage context data; and
   creating a consumption context pattern on the basis of the estimated workload resource cost and budget impact relative to the enterprise context data.

13. The method of claim 12, further comprising reporting, by the cloud brokerage computing device, cost consumption data through a graphical user interface on a display device.

14. The method of claim 13, further comprising displaying, by the cloud brokerage computing device, an alert notification through the graphical user interface when a predetermined quota allocation threshold is exceeded, wherein the predetermined quota allocation threshold is determined from the enterprise context data.

15. The method of claim 1, wherein the workload pattern parameter is at least one of a usage pattern associated with the at least one cloud platform, a demand pattern associated with the at least one cloud platform or a quality of service parameter associated with the at least one cloud platform.

16. A cloud brokerage device, comprising:
   at least one processor and an associated processor readable memory comprising instructions that, when executed by the at least one processor, cause the processor to:
      receive workload input data for a workload, wherein the workload input data comprises at least one workload pattern parameter, policy parameter, or cost attribute;
      determine resource optimization data based on the workload input data, wherein the determining the resource optimization data comprises determining, compliance of the workload with one or more audit and regulatory metrics, cost consumption of the workload, and non-functional context data associated with the workload, wherein the audit and regulatory metrics include at least one of an enterprise regulatory compliance metric, an industry standards body compliance metric or a governmental regulatory compliance metric and the cost consumption includes metering cost associated with deploying the workload based on a budget;
      apply one or more rules to the workload input data, wherein the one or more rules comprise at least one of an information technology, business, compliance, departmental, portfolio or enterprise context rule in a rules repository database; and
      deploy the workload across a cloud ecosystem according to deployment plan data generated based on the resource optimization data and the application of the one or more rules to the workload input data, wherein the deployment plan data comprises a deployment plan for optimally deploying the workload that is generated prior to deployment of the workload on any platform.

17. The device of claim 16, wherein the non-functional context data comprises at least one of enterprise context data, user persona context data, business workload context data, technical context data, application lifecycle context data, service provider context data, or service usage context data.

18. The device of claim 17, wherein the enterprise context data comprises at least one of information security rules, governance rules, budget data, business goal targets data, capital and operation expenditure data, or business performance data.

19. The device of claim 17, wherein the user persona context data comprises at least one of job profile data, user behavior data, user service usage data, organizational hierarchy data, a social connections index, or historical usage data.

20. The device of claim 17, wherein the technical context data comprises workload resource requirements data, technical interoperability data, location data, or data usage data.

21. The device of claim 17, wherein the service usage context data comprises computing resource consumption data, service usage cost data, or service usage compliance data.

22. The device of claim 16, wherein the processor readable memory further comprises one or more additional instructions that, when executed by the processor, further cause the processor to:
   analyze the non-functional context data associated with the workload for deviations from one or more retrieved policies comprising a predefined industry regulatory compliance policy, a predefined enterprise regulatory compliance policy, or a predefined governmental regulatory compliance policy; and
   trigger an alert notification based on the analysis, wherein the alert notification is a communicated to a user through a graphical user interface on a display device triggering an alert notification, wherein the alert notification is a communicated to a user through a graphical user interface on a display device.

23. The device of claim 22, wherein the processor readable memory further comprises one or more additional instructions that, when executed by the processor, further cause the processor to provide a remedial recommendation, wherein the remedial recommendation comprises information related to enforcing policy compliance by the workload.

24. The device of claim 22, wherein the processor readable memory further comprises one or more additional instructions that, when executed by the processor, further cause the processor to:
   retrieve a first user profile context data in the captured non-functional context data;
   create a functional collaboration context on the basis of the at least one first user profile context data, wherein the functional collaboration context associated with the workload is determined based on an organizational hierarchy associated with the at least one first user profile, historical behavior associated with the at least one first user profile, or a social connection context associated with the at least one first user profile; and communicate a collaboration notification to a second computing device associated with a second user, wherein the second computing device is network connected to the first user computing device and wherein:
  the network address of the second computing device is determined based on historical behavior data associated with a second user profile, the second user profile context data being stored on the context repository database; and
  the second user profile is determined on the basis of the functional collaboration context associated with the first user profile.

25. The device of claim 24, wherein the processor readable memory further comprises one or more additional instructions that, when executed by the processor, further cause the processor to communicate a deployment approval notification to the second computing device.

26. The device of claim 25, wherein the processor readable memory further comprises one or more additional instructions that, when executed by the processor, further cause the processor to deploy the workload only when the deployment approval notification is relayed back by the second computing device.

27. The device of claim 16, wherein the processor readable memory further comprises one or more additional instructions that, when executed by the processor, further cause the processor to:
  meter computing resource consumption or cloud service consumption of the workload;
  compute charges associated with the workload on the basis of service subscription data retrieved from a service subscriptions repository database;
  validate charges associated with actual computing resource or cloud service consumption by the workload against budget data in a set of enterprise context data in the workload input data and the service usage context data; and
  create a consumption context pattern on the basis of the estimated workload resource cost and budget impact relative to the enterprise context data.

28. The device of claim 27, wherein the processor readable memory further comprises one or more additional instructions that, when executed by the processor, further cause the processor to report cost consumption data through a graphical user interface on a display device.

29. The device of claim 28, wherein the processor readable memory further comprises one or more additional instructions that, when executed by the processor, further cause the processor to display an alert notification through the graphical user interface when a predetermined quota allocation threshold is exceeded, wherein the predetermined quota allocation threshold is determined from the enterprise context data.

30. The device of claim 16, wherein the workload pattern parameter is at least one of a usage pattern associated with the at least one cloud platform, a demand pattern associated with the at least one cloud platform or a quality of service parameter associated with the at least one cloud platform.

31. A non-transitory computer readable medium having stored thereon instructions for improved deployment of workloads across cloud platforms of an integrated cloud ecosystem, which, when executed by at least one processor, causes the processor to perform steps comprising:
  receiving workload input data for a workload, wherein the workload input data comprises at least one workload pattern parameter, policy parameter, or cost attribute;
  determining resource optimization data based on the workload input data, wherein the determining the resource optimization data comprises determining, compliance of the workload with one or more audit and regulatory metrics, cost consumption of the workload, and non-functional context data associated with the workload, wherein the audit and regulatory metrics include at least one of an enterprise regulatory compliance metric, an industry standards body compliance metric or a governmental regulatory compliance metric and the cost consumption includes metering cost associated with deploying the workload based on a budget;
  applying one or more rules to the workload input data, wherein the one or more rules comprise at least one of an information technology, business, compliance, departmental, portfolio or enterprise context rule in a rules repository database; and
  deploying the workload across a cloud ecosystem according to deployment plan data generated based on the resource optimization data and the application of the one or more rules to the workload input data, wherein the deployment plan data comprises a deployment plan for optimally deploying the workload that is generated prior to deployment of the workload on any platform.

32. The non-transitory computer readable medium of claim 1, wherein the non-functional context data comprises at least one of enterprise context data, user persona context data, business workload context data, technical context data, application lifecycle context data, service provider context data, or service usage context data.

33. The non-transitory computer readable medium of claim 32, wherein the enterprise context data comprises at least one of information security rules, governance rules, budget data, business goal targets data, capital and operation expenditure data or business performance data.

34. The non-transitory computer readable medium of claim 32, wherein the user persona context data comprises at least one of job profile data, user behavior data, user service usage data, organizational hierarchy data, a social connections index or historical usage data.

35. The non-transitory computer readable medium of claim 32, wherein the technical context data comprises workload resource requirements data, technical interoperability data, location data or data usage data.

36. The non-transitory computer readable medium of claim 32, wherein the service usage context data comprises computing resource consumption data, service usage cost data, or service usage compliance data.

37. The non-transitory computer readable medium of claim 1, wherein the determining compliance with one or more audit and regulatory metrics further comprises:
  analyzing the non-functional context data associated with the workload for deviations from one or more retrieved policies comprising a predefined industry regulatory compliance policy, a predefined enterprise regulatory compliance policy, or a predefined governmental regulatory compliance policy; and
  triggering an alert notification, based on the analysis, wherein the alert notification is a communicated to a user through a graphical user interface on a display device.

38. The non-transitory computer readable medium of claim 37, wherein the instructions, when executed by the at least one processor, further causes the processor to perform steps further comprising providing a remedial recommendation to a user through the display device, wherein the remedial recommendation comprises information related to enforcing policy compliance of the workload.

39. The non-transitory computer readable medium of claim 37, wherein the instructions, when executed by the at least one processor, further causes the processor to perform steps further comprising:

retrieving at least one first user profile context data from the context repository database;

creating a functional collaboration context on the basis of the at least one first user profile context data, wherein the functional collaboration context associated with the workload is determined based on an organizational hierarchy associated with the at least one first user profile, historical behavior associated with the at least one first user profile, or a social connection context associated with the at least one first user profile; and communicating a collaboration notification to a second computing device associated with at least one second user, wherein the at least one second computing device is network connected to the at least one first user computing device and wherein:

the network address of the at least one second computing device is determined based on historical behavior data associated with at least one second user profile, the at least one second user profile context data being stored on the context repository database; and the at least one second user profile is determined on the basis of the functional collaboration context associated with the first user profile.

40. The non-transitory computer readable medium of claim 39, wherein the instructions, when executed by the at least one processor, further causes the processor to perform steps further comprising communicating a deployment approval notification to the second computing device.

41. The non-transitory computer readable medium of claim 40, wherein the instructions, when executed by the at least one processor, further causes the processor to perform steps further comprising deploying the workload only when the deployment approval notification is relayed back by the second computing device.

42. The non-transitory computer readable medium of claim 32, wherein the monitoring cost consumption further comprises:

metering cloud service consumption or computing resource consumption by the workload;

calculating charges associated with the workload on the basis of service subscription data retrieved from a service subscriptions repository database;

validating charges associated with the cloud service consumption or computing resource consumption by the workload against budget data in a set of enterprise context data in the workload input data and the service usage context data; and creating a consumption context pattern on the basis of the estimated workload resource cost and budget impact relative to the enterprise context data.

43. The non-transitory computer readable medium of claim 42, wherein the instructions, when executed by the at least one processor, further causes the processor to perform steps further comprising reporting cost consumption data through a graphical user interface on a display device.

44. The non-transitory computer readable medium of claim 43, wherein the instructions, when executed by the at least one processor, further causes the processor to perform steps further comprising displaying an alert notification through the graphical user interface when a predetermined quota allocation threshold is exceeded, wherein the predetermined quota allocation threshold is determined from the enterprise context data.

45. The non-transitory computer readable medium of claim 32, wherein the workload pattern parameter is at least one of a usage pattern associated with the at least one cloud platform, a demand pattern associated with the at least one cloud platform or a quality of service parameter associated with the at least one cloud platform.

* * * * *